INVENTORS.
LESTER C. VAN ATTA,
FREDERICK W. CLEARY,
BY Henry Heyman
ATTORNEY

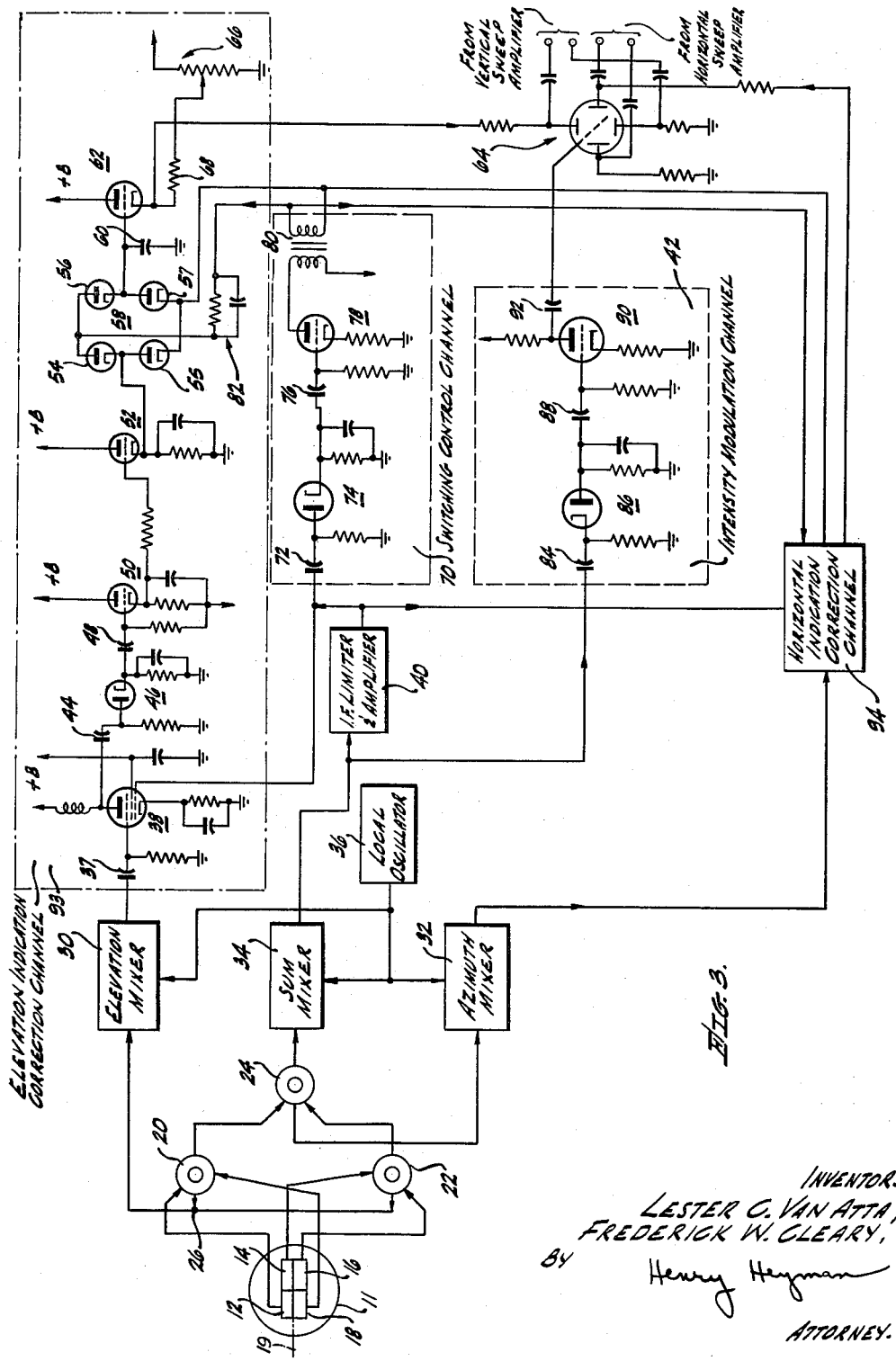

3,042,914
RADAR TARGET INDICATOR CORRECTION SYSTEM
Lester C. Van Atta and Frederick W. Cleary, Pacific Palisades, Calif., assignors to Hughes Aircraft Company, Culver City, Calif., a corporation of Delaware
Filed Aug. 26, 1954, Ser. No. 452,307
9 Claims. (Cl. 343—5)

This invention relates to radar and target indicator systems and more particularly to a system for providing on an indicator a single response point for a single target as presented, for example, by an isolated aircraft to a monopulse radar system.

Ordinarily, because of the finite beam width of the antenna pattern of the radar scanning antenna, there is some target response when the antenna is "off target" and thus there is an indication of the target on the indicator displaced from the true position of the target. Accordingly, the energy reflected and received from the target is spread over an area on the indicator corresponding to the solid angle representing the antenna beam width. The present invention automatically shifts all target response on the indicator to the correct point.

Accordingly, it is an object of the invention to provide a radar indicator correction system to cause all the reflected energy received from a target to be presented at one spot, instead of over an area represented by the antenna beam width.

It is a further object to increase the visual sensitivity of a radar indicator by concentrating the target indication.

It is another object of the invention to generally improve the definition and accuracy of the presentation of the targets on a radar indicator.

Briefly, in accordance with this invention, target response, representative of all the energy received from a target is presented on the indicator at a position to represent the direction of pointing of the antenna corrected by the error signal information from a simultaneous antenna lobing system wherein the magnitude and phase of the error signals are a measure of the angle between the line from antenna to target and the actual direction of antenna pointing. The magnitude and phase of the error signals are then resolved and used to correct the position of indication of the target on the indicator screen.

The novel features which are believed to be characteristic of the invention, both as to its organization and method of operation, together with further objects and advantages thereof, will be better understood from the following description considered in connection with the accompanying drawings made a part of this specification. The scope of the invention is pointed out in the claims.

In the drawings,

FIG. 3 is a combination schematic and block diagram of a suitable system embodying the invention.

Figure 1:
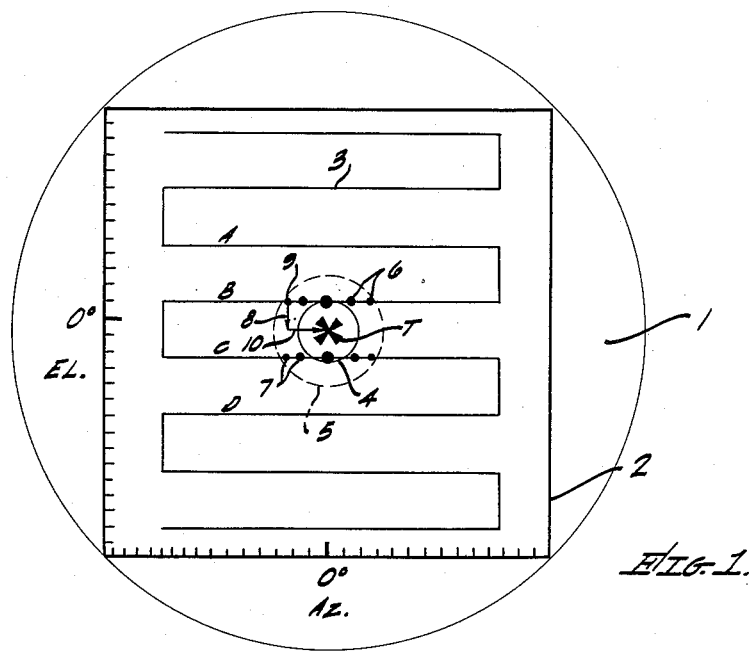
FIG. 1 is a view of a typical monopulse radar indicator face without target indication correction showing a single target dead ahead.

Referring to FIG. 1, indicator face 1 is calibrated in elevation angle versus azimuth angle of antenna direction such that the entire solid angle to be scanned by the antenna is represented by the rectangle 2. Scan pattern 3 represents the scanning of the solid angle by the antenna. In accordance with common practice, the horizontal sweeps A, B, C and D of scan pattern 3 are assumed to be separated by a distance representative of the half power or 3 db beam width of the antenna; and the distance between alternate horizontal sweeps, such as A and C, represents the full beam width between nulls; then a target T lying within the scan solid angle will normally be detected on two of the horizontal scan sweeps. Surrounding the true angular position of target T are shown concentric circles 4 and 5 representing, if the antenna were pointing directly at T, the 3 db and full beam width contours, respectively. Dots 6 shown on horizontal scan line B represent echo pulses received from target T as the antenna sweeps along line B; and dots 7 shown on scan line C represent echo pulses received from target T as the antenna sweeps along scan line C. The rows of dots (either separated or unresolved) are the usual presentation and an operator must deduce from them the true position of the target.

Vector 8 represents the vertical error signal derived from the simultaneous antenna lobing system which, by means of this invention, causes dot 9, for example, to be displaced downwardly to the horizontal vector 10. Likewise, vector 10 represents the horizontal error signal associated with dot 9 and may be used to cause dot 9 to be displaced to the right, such that, in combination with the vertical error signal represented by vector 8, dot 9 is displayed at position T. Similarly, each of the dots which would ordinarily be displayed along scan lines B and C has associated therewith a pair of error signals which, by means of this invention, are resolved and adapted to cause each respective dot along scan lines B and C to be displaced and presented at one spot T.

Figure 2:
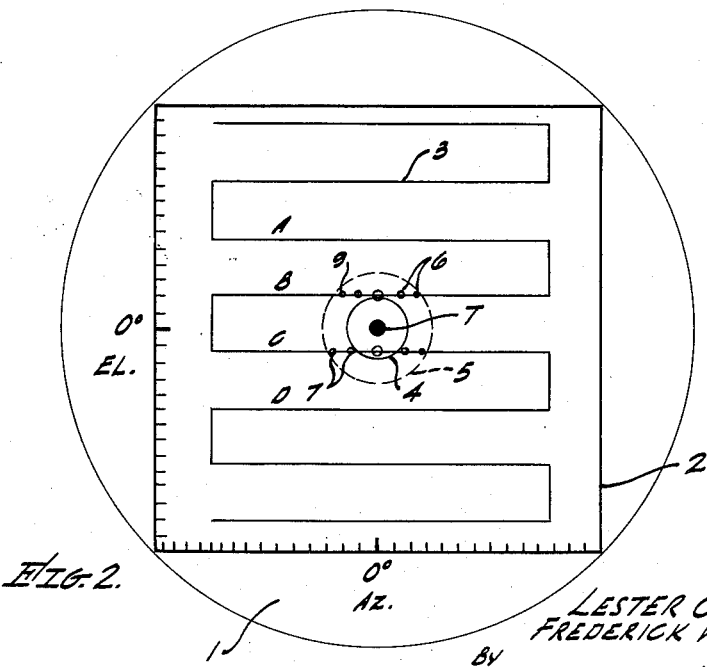
FIG. 2 is a similar view of the same indicator face showing the results of target indication correction.

FIG. 2 shows the same indicator face configuration after dots 6 and 7 have been displaced and presented at position T. Thus, the target indication is presented at its true position on the indicator face thereby saving the operator the task of deducing the target's position from the rows of dots. Also the corrected target presentation is represented by a stronger, more intense visual signal than would be each of the individual dots. A suitable circuit arrangement to achieve the corrected presentation of FIG. 2 will now be explained with reference to FIG. 3.

Referring to FIG. 3, scanning is accomplished by means of an antenna reflector 11 which supports four separate radiating antenna elements or horns 12, 14, 16 and 18 spaced about the scan axis 19. Two of the horns 12 and 14 are on a horizontal line above the axis 19 of reflector 11, and the other horns 16 and 18 are on a horizontal line below the axis. Further, the pairs of horns 12, 18 and 14, 16 are vertically aligned, respectively, at the left and right of the scan axis 19.

Antenna elements 12, 14, 16, 18 feed ring circuit hybrids or duplexers 20 and 22, the structure and operation of which is fully discussed in Microwave Duplexers M.I.T. Radiation Laboratory Series, vol. 14, chapter 8, p. 357 by Smullin and Montgomery. Antenna horn elements 14 and 16 (the right elements) are coupled to hybrid 22. Hybrids 20 and 22 each have one output connected to a similar ring circuit hybrid 24 and another output each connected through a common junction 26 to an elevation mixer 30. One output of hybrid 24 is connected to an azimuth mixer 32, and the remaining output of hybrid 24 is connected to a sum mixer 34. A local oscillator 36 is coupled to elevation mixer 30, azimuth mixer 32 and sum mixer 34 to provide intermediate frequency outputs from mixers 30, 32 and 34.

Elevation mixer 30 is coupled to an elevation correction channel 93, and azimuth mixer 32 is coupled to a horizontal indication correction channel 94. Sum mixer 34 is coupled to a conventional intermediate-frequency (IF) limiter and amplifier 40. Channels 93 and 94 are identical; hence, details for only one channel 93 will be described.

Signals from mixer 30 and IF limiter and amplifier 40 are applied to an electronic adder circuit. The adder circuit shown comprises an electron discharge device, such as a pentode tube 38 which has its suppressor grid coupled through a capacitor 37 to mixer 30. The signal grid of tube 38 is coupled to the limiter and amplifier 40.

The anode of tube 38 is coupled to the anode of a diode detector 46, the output of which is coupled through a capacitor 48 to the control grid of a cathode follower 50. The output of cathode follower 50 is impressed upon the control grid of a second cathode follower 52. Four diodes 54, 55, 56 and 57 are interconnected to provide a bidirectional switch 58 wherein the cathode and anode, respectively, of diodes 54, 55 are connected to the cathode of cathode follower 52; and the cathode and anode of diodes 56, 57 are connected to a storage capacitor 60. The voltage on storage capacitor 60 is impressed upon the control grid of a cathode follower 62, the output of which is coupled to the vertical deflection plates of an indicator scope 64. A potentiometer resistor 66 is connected between ground and a point of negative potential, and its sliding contact is coupled through a resistor 68 to the cathode of cathode follower 62.

IF limiter and amplifier 40 is also coupled to a reference demodulating carrier channel 70 which contains an input capacitor 72 coupled to an IF detector 74. The output of detector 74 is coupled through a coupling capacitor 76 to the control grid of a pulse amplifier 78, the anode of which is coupled to the primary of an output transformer 80. The secondary of transformer 80 is coupled to the anodes of diodes 54, 56 through an R-C network 82 and the cathodes of diodes 55 and 57 of bidirectional switch 58.

Sum mixer 34 is coupled to the input of a scope intensity modulation channel 42. The output of sum mixer 34 is coupled through a capacitor 84 to an IF detector 86, the output of which is coupled through a capacitor 88 to video amplifier 90. The anode of amplifier tube 90 is coupled through a capacitor 92 to the intensity grid of indicator scope 64.

The output of azimuth mixer 32 and limiter and amplifier 40 are coupled to horizontal indication correction channel 94 in such manner that channel 93 is coupled to elevation mixer 30 and limiter and amplifier 40. As previously mentioned, channel 94 is identical to the channel 93. The output of channel 94 is coupled to the horizontal deflection plates of indicator scope 64.

Referring again to the drawing, the operation of the invention will be described by tracing received radar signals from antenna to indicator.

Received radar energy reflected from a distant target is impressed upon antenna elements 12, 14, 16 and 18. In a manner described and discussed in the above cited reference, the hybrids 20, 22 and 24 combine the received output of the antenna elements in a manner such that the input to elevation mixer 30 is the algebraic difference between the energy received by upper antenna elements 12, 14 and that received by lower antenna elements 16, 18. Thus, when the energy received by the upper elements is equal to that received by the lower elements, in which case the target is at an elevation angle of zero with respect to the scan axis 19, there is no input to elevation mixer 30. When the energy received by the upper elements is greater than that received by the lower elements (when the target is above the beam axis of the antenna) the input to elevation mixer 30 has an RF phase angle which is 180° out of phase with respect to the phase angle when the energy received by the lower antenna elements is greater than that received by the upper antenna elements, that is, when the target is below the beam axis. Thus, if zero phase angle designates the condition when the upper antenna elements receive the greater amount of the energy, the RF input to elevation mixer 30 has a phase angle of 180° when the lower antenna elements receive the greater portion of the energy. Thus, the magnitude of the difference between the energy received by the upper and the lower antenna horns is a measure of the amplitude of the elevation angle of target displacement from the beam axis, and the zero or 180° phase indicates whether the target is above or below the beam axis. In exactly the same manner, the RF input to azimuth mixer 32 is the algebraic difference between the energy received by the left antenna horns and that energy received by the right horns. In this case, a zero phase angle indicates that the target is to the left of the antenna scan axis and 180° phase angle indicates that the target is to the right of the antenna beam axis. Again, the magnitude of the above difference indicates the amplitude of the azimuth angle of displacement of the target from the antenna beam axis.

The input to sum mixer 34 from hybrid 24 is the sum of the energy from all the antenna elements. This signal is used as a phase reference, and its phase may be arbitrarily designated zero degrees.

In a conventional manner, the output of local oscillator 36 is mixed in each of the mixers 30, 32, 34 in order that their respective RF inputs provide three IF outputs, each having the same frequency and whose phase is determined by the phase of the RF input as previously explained.

The IF output of sum mixer 34 is impressed upon intensity modulation control channel 42 through coupling capacitor 84. IF detector 86 demodulates and rectifies the summed signal which is then impressed through coupling capacitor 88 upon video amplifier 90. The output of amplifier 90 is impressed upon the intensity control grid of an indicator scope 64 in a manner such that, when a target signal is intercepted by reflector 11, indicator scope 64 is "turned on." The summed IF signal is also impressed upon the amplifier 40, which operates in a conventional manner to limit amplitude variations of the sum signal.

The output signal of limited-amplifier 40 is impressed upon the control grid of multi grid tube 38. This signal consists of short IF pulses representing a target and is amplified by tube 38 and impressed upon IF detector 46 which demodulates and rectifies the signal. As previously indicated, the IF signal applied to the suppressor grid of tube 38 may be either in phase or 180° out of phase with the signal applied to the control grid of tube 38. If the elevation signal is not zero and is in phase with the summed signal, the elevation signal impressed upon tube 38 causes a greater signal to appear at the plate than would appear without the elevation signal. If on the other hand, the elevation signal is of opposite phase from the summed signal, the signal at the plate of tube 38 will be decreased. Thus, the video signal appearing at the grid of pulse stretcher tube 50 consist of a chain of pulses representing the target, the amplitudes of which vary as antenna 10 scans vertically above and below the target. Thus, it will be seen that the output of limiter-amplifier 40 is used as a phase reference for the signals from elevation mixer 30.

The output of pulse stretcher 52, which is a conventional pulse stretcher circuit, consists of video pulses to which has been added considerable energy from the plate supply. This output is applied by means of bidirectional switch 58 to storage capacitor 60, the charge on which rapidly follows a level proportional to the signal output of pulse stretcher 52.

Switch 58 is turned "on" in coincidence with the arrival of echo pulses from the target by means of demodulated reference carrier channel 70. The output of IF limiter-amplifier 40 is demodulated and rectified by detector 74 and further impressed through coupling capacitor 76 to pulse amplifier 78. The pulse output of amplifier 78 is impressed across the primary of output transformer 80, and the pulses appearing across the secondary are fed in parallel to both elevation and horizontal indication correction channels 93 and 94, respectively. Carrying through the detailed description of elevation channel 93, the output of transformer 80 is impressed upon R-C circuit 82 and thence is applied to bidirectional switch 58 as a switching signal. Switch 58 is held open by the voltage built up across R-C circuit 82 until the arrival of the succeeding signal from the target when storage capacitor 60 will be charged to the new level corresponding to the new elevation angle error.

The voltage stored on capacitor 60 is presented through cathode follower 62 to the vertical plates of the indicator scope 64 thus affording vertical correction to target response which would otherwise be presented as in FIG. 2 above or below the true position of the target. That component of the voltage on capacitor 60 which is due to the output of IF limiter-amplifier 40 is constant within the range of operation and may be balanced out by means of vertical centering control 66. A similar control in horizontal indication correction channel 94 performs the same function for the horizontal plates of indicator scope 64; and the result is the target as presented in FIG. 3.

It will be understood that limiter-amplifier 40 and reference channel 70 are utilized as references for channel 94 in the same manner as above described in detail for channel 93.

What is claimed is:

1. A radar target indicator correction system comprising: a simultaneous lobing radar receiving system including a scanning antenna having an axis and being adapted to be pivoted to cause the axis to follow a predetermined scan pattern for scanning a region in which a target may be located; a cathode ray visual presentation indicator having first and second orthogonal electron beam positioning means; means coupled to said scanning antenna and to said first and second electron beam positioning means to cause a cathode ray beam to follow said predetermined scan pattern; and error signal means coupled to said scanning antenna to develop first and second orthogonal error signals representative of the respective angular positions of a target with respect to the antenna axis when the target lies within the antenna beam, said error signal means including a first indication correction channel responsive to the phase and amplitude of the first of said error signals and being coupled to said first electron beam positioning means to correct the position of the cathode ray beam in one dimension, and a second indication correction channel responsive to the phase and amplitude of the second of said error signals and being coupled to said second electron beam positioning means to correct the position of the cathode ray beam in a second dimension orthogonal to said one dimension; whereby said target is presented at a single point on said indicator corresponding to the true angular position of said target.

2. A radar target indicator correction system comprising: a simultaneous lobing radar receiving system including a scanning antenna having an axis and being adapted to be pivoted to cause the axis to follow a predetermined scan pattern for scanning a region in which a target may be located; a cathode ray visual presentation indicator having elevation and azimuth indication positioning means for an electron beam; means coupled to said scanning antenna and to said elevation and azimuth indication positioning means to cause said electron beam to follow said predetermined scan pattern; and error signal means coupled to said scanning antenna to develop vertical and horizontal antenna direction error signals representative of the respective angular positions of a target with respect to the antenna axis when the target lies within the antenna beam, said error signal means including an elevation indication correction channel responsive to the phase of said vertical direction error signal and being coupled to said elevation positioning means to correct the position of said electron beam in one dimension, and a horizontal indication correction channel responsive to the phase of said horizontal direction error signal and being coupled to said azimuth positioning means to correct the position of said electron beam in a second dimension; whereby said target is presented at a single point on said indicator corresponding to the true angular position of said target.

3. In a monopulse radar system of the character adapted for providing elevation and azimuth antenna direction error signals and a phasse reference summed signal from an antenna system having an axis and a finite beam width, said antenna system intercepting received target signals at the antenna and mixing said signals in a network of radio frequency hybrids, the direction error signals being in phase with the summed signal when a target is in one direction from the antenna axis and out of phase when the target is in the opposite direction from said axis and having a visual display utilizing horizontal and vertical deflection means for presentation of target position, the combination therewith of means for resolving said direction error signals and applying correction signals to said display deflection means in a manner to correct the target direction shown thereon, said correction being introduced to preclude a spread of target response indication due to the finite beam width of said antenna system, said means comprising: an elevation indication correction channel; an azimuth indication correction channel; a phase reference and switching channel, said elevation and azimuth correction channels being coupled to said hybrid network and being adapted to receive, respectively, the elevation and azimuth error signals and develop respective intermediate frequency signals of a predetermined frequency, said phase reference and switching channel being adapted to receive said phase reference summed signal and to develop an intermediate frequency phase reference and summed signal of said predetermined frequency; a limiter coupled to said phase reference and switching channel, said limiter being adapted to amplitude-limit the intermediate frequency signal from said phase reference and switching channel; an intensity modulation channel coupled to said limiter, said channel being adapted to convert said limited signal into a signal for intensity modulating said display indicator; first and second adders, said adders being coupled to said limiter and being adapted to receive and combine the said reference summed intermediate frequency signal and the respective intermediate frequency signals from said elevation and azimuth channels, said adders being operative to develop signals of greater magnitude when the respective intermediate frequency signals are in phase with respect to said limited signal and of lesser magnitude when the respective intermediate frequency signals are out of phase with said summed signals; first and second centering controls, first circuit means coupling said first centering control to said first adder; and second circuit means coupling said second centering control to said second adder, said first centering control being coupled to the vertical deflection means of said display indicator, said second centering control being coupled to the horizontal deflection means of said display indicator, said first circuit means being effective to cause said first centering control to apply to said vertical deflection means a correction signal which causes an additional and corrective vertical deflection, and said second circuit means being effective to cause said second centering controls to apply to said horizontal deflection means a correction signal which causes an additional and corrective horizontal deflection, said first and second circuit means thus being operative to cause said target indication to be presened at a single point on said indicator representative of the target's true position.

4. In a radar system of the character adapted for providing elevation and azimuth antenna direction error signals and a phase reference summed signal from an antenna system having an axis and a finite beam width and scanning an area in space, said antena system intercepting received signals at the antenna and combining said signals in a network of radio frequency hybrids, the error signals being in phase with the summed signal when a target is in one direction from the axis of the antenna and out of phase when the target is in the opposite direction from said axis and having a visual display coupled to said antenna system and responding to the scanning motion of said antena for presentation of target position, the combination therewith of means for resolving said error signals to form correction signals and applying them to said display in a manner to correct the target bearing shown thereon, said correction being introduced to preclude a spread of target response indication due to said antenna beam width, said means comprising: an elevation indication correction channel; a phase reference and switching channel; first and second mixers coupled to said hybrid network; a first mixer input to said elevation channel, said elevation channel being adapted to receive the radio frequency elevation direction signal upon said first mixer input from said hybrid network; a second mixer input to said phase reference and switching channel, said phase reference and switching channel being adapted to receive said summed signal upon said second mixer input from said hybrid network; a local oscillator, the output of said oscillator being coupled to said mixer inputs such that the outputs of said mixers are at an intermediate frequency; a limiter, said limiter being adapted to amplitude limit the intermediate frequency output of said second mixer; an intensity modulation channel, said channel being adapted to convert in a conventional manner the intermediate frequency output of said limiter into a signal for intensity modulating said display indicator; an adder, said adder being adapted to receive as a phase reference signal the intermediate frequency output of said limiter, said adder being also adapted to receive the intermediate frequency ouput of said first mixer and having an output representative of the sum of said limiter output and said first mixer output; a detector, said detector being adapted to demodulate and rectify the output of said adder; a pulse stretcher, said pulse stretcher being adapted to stretch the output of said detector; a storage capacitor; an electronic switch, said electronic switch being adapted to couple said pulse stretcher to said storage capacitor at a predetermined instant; a video detector circuit, said circuit being coupled to said limiter and adapted to convert the output signal of said limiter into an actuating signal for said switch such that the switch is closed responsive to the radar received echo such that through the action of said switch said pulse stretcher is periodically connected to said storage capacitor; an elevation centering control, said control being coupled to said storage capacitor and adapted to balance out in a conventional manner that component of the voltage appearing on said storage capacitor due to the output of said limiter being applied to said adder, said centering control being coupled in a conventional manner to the vertical deflection means of said display indicator for the purpose of correcting the vertical positioning of target response indication upon said display indicator resulting from said vertical direction control signal; a horizontal indication correction channel being similar in all respects to said elevation indication correction channel and being coupled in like manner to the horizontal deflecting means of said display indicator for the purpose of correcting the horizontal positioning of target response indication upon said display resulting from said horizontal direction control signal.

5. In combination with a monopulse radar antenna system of the character which provides two sets of orthogonal direction error signals of the type having one phase for one direction of error and an opposite phase for an opposite direction of error and a signal-controlled cathode ray type indicator which presents a visual presentation in response to target echo signals, an arrangement for providing from the orthogonal direction error signals, correction control signals for the indicator, this arrangement comprising: two phase responsive indication correction channels, each being coupled between the monopulse antenna system and the indicator to receive one of the sets of orthogonal direction error signals and impress on the indicator, correction control signals in response to said error signals for correcting the position of the visual presentation of the target echos in accordance with the phase and amplitude of said error signals.

6. In a radar sysem utilizing a simultaneous lobing antenna which provides monopulse type error signals representative of a target's direction from the antenna axis and having a signal-controlled visual display means for presenting target position information, an arrangement for providing from the error signals, correction conrol signals for the visual display means to correct the display and provide the true target position, the arrangment comprising; two indication correction channels each coupled between the simultaneous lobing antenna and the visual display means; each channel including adder means coupled to the antenna for establishing in response to the phase of the monopulse type error signals, one component of the target's direction from the antenna axis in accordance with the sense and magnitude of said error signals, demodulation means coupled to said adder means, signal storage means, and bi-directional switching means interposed between said demodulation means and said signal storage means to periodically couple signals from said demodulation means to said signal storage means, said signal storage means being coupled to the visual display means.

7. A radar target indicator correction system comprising: a monopulse radar receiving system employing a scanning antenna having an antenna axis which is adapted to follow a predetermined scan pattern for scanning a region in which a target may be located, a cathode ray indicator device having first and second orthogonal electron beam positioning means synchronized with the scanning antenna to cause the cathode ray beam to follow the scan pattern, wherein the cathode ray indicator is coupled to the scanning antenna to effect a visual presentation along the scan pattern, of echo pulses received from a target, and wherein respective means coupled to the scanning antenna develop first and second orthogonal error signals whose magnitudes represents respectively, first and second orthogonal displacement angle magnitudes with respect to the antenna axis, the combination therewith of radar target indication correction means comprising: first means coupling the first error signal developing means to the first electron beam positioning means of the indicator, and second means coupling the second error signal developing means to the second electron beam positioning means of the indicator, said beam positioning means being operative in response to said error signals to cause the echo pulses from the target to be displayed at a single point which corresponds to the target's true angular position within the scanned region.

8. A radar target indicator correction system comprising: a monopulse radar receiving system employing a scanning antenna having an axis which is adapted to follow a predetermined scan pattern for scanning a region in which a target may be located, a cathode ray indicator device having a respective horizontal and vertical electron beam positioning means synchronized with the scanning antenna to cause the cathode ray beam to follow the scan pattern, said cathode ray indicator device being coupled to said scanning antenna to effect a visual presentation along the scan pattern of echo pulses received from a target within the scanned region, azimuth error signal means and elevation error signal means coupled to said scanning antenna for respectively developing azimuth and elevation error signals whose magnitudes represent the horizontal and vertical displacement angle magnitudes with respect to the antenna axis, first means adapted to couple said azimuth error signal developing means to the horizontal electron beam positioning means of said indicator device, and second means adapted to couple said elevation error signal developing means to the vertical electron beam positioning means of said indicator device, said horizontal beam positioning means being operative in response to the azimuth error signals to cause the echo pulses from the target to be displayed on a vertical line which corresponds to the target's true azimuth angle, and said vertical beam positioning means being responsive to the elevation error signals to cause the echo pulses from the target to be displayed on a horizontal line which corresponds to the target's true elevation angle, whereby the echo pulses received from the target are displayed at a single point which corresponds to the target's true angular position within the scanned region.

9. A radar target indicator correction system comprising: a radar system of the character including a cathode ray type of visual target display means and a simultaneous lobing antenna system including an antenna having an axis for scanning a predetermined solid angle in the space about the antenna and which develops simultaneously a summed signal as well as elevation and azimuth error signals representative of the angular deviation between the axis of the antenna and the line-of-sight to the target and of the character which are in phase with said summed signal when said angular deviation is in one direction from the antenna axis and of opposite phase when in the other direction, said summed signal being representative of the total echo energy received from the target for intensifying the beam on said cathode ray tube visual target display means, said display means having vertical and horizontal deflection means which cause said beam to follow a path on the indicator face representing the antenna scan pattern, a vertical indication correction channel coupled to said antenna for receiving said elevation error signal and said summed signal and combining said signals in a manner such that the polarity of said error signal is established and said summed signal is positive or negative according to the phase of said elevation error signal, said vertical indication correction channel being coupled to said vertical deflection means and being adapted to instantaneously add additional deflection responsive to the polarity as well as the magnitude of the error signal to said vertical deflection means in synchronism with said intensifying summed signal, and a horizontal indicator correction channel adapted in like manner, to couple said azimuth error signal to said azimuth deflection means to instantaneously correct the horizontal indication, the vertical and horizontal correction being operative to cause the target response to be displayed at a single point on said indicator representative of the target's true angular position in said predetermined solid angle.

References Cited in the file of this patent

UNITED STATES PATENTS

| | | |
|---|---|---|
| 2,530,060 | Holdam | Nov. 14, 1950 |
| 2,608,683 | Blewett | Aug. 26, 1952 |
| 2,617,093 | Fyler | Nov. 4, 1952 |
| 2,700,763 | Foin | Jan. 25, 1955 |
| 2,948,892 | White | Aug. 9, 1960 |

OTHER REFERENCES

Air Force Manual, No. 52–8; Radar Circuit Analysis; June 30, 1951; chapter 5, page 7.